United States Patent [19]

Koch et al.

[11] 4,249,882
[45] Feb. 10, 1981

[54] DIE CASTING SYSTEM FOR THE PRODUCTION OF RUBBER MOULDINGS

[75] Inventors: Friedrich Koch, Achim; Norbert Thiele, Bremen, both of Fed. Rep. of Germany

[73] Assignee: Desma-Werke GmbH, Achim, Fed. Rep. of Germany

[21] Appl. No.: 953,300

[22] Filed: Oct. 20, 1978

[30] Foreign Application Priority Data

Nov. 10, 1977 [DE] Fed. Rep. of Germany ....... 2750232

[51] Int. Cl.³ .............................................. B29H 3/08
[52] U.S. Cl. .................................... 425/547; 425/554; 425/444; 425/588; 425/572
[58] Field of Search ............... 425/114, 116, 127, 128, 425/129, 511, 515, 518, 519, 506, 507, 508, 509, 526, 528, 532, 533, 537, 547, 548, 522, 552, 554, 556, 573, 572, 588, 581, DIG. 42; 249/57, 63, 67, 68, 79, 81, 105, 107, 110

[56] References Cited

U.S. PATENT DOCUMENTS

| | | | |
|---|---|---|---|
| 2,799,435 | 7/1957 | Abplanalp | 249/110 X |
| 2,878,517 | 3/1959 | Cramer | 249/107 |
| 3,482,814 | 12/1969 | Hedgewick | 249/67 |
| 3,774,874 | 11/1973 | Clark | 249/67 X |
| 3,809,356 | 5/1974 | Doyel | 249/105 X |
| 3,819,312 | 6/1974 | Arpajian | 425/547 X |
| 3,825,457 | 7/1974 | Holroyd et al. | 425/515 X |
| 3,933,967 | 1/1976 | Taylor | 425/519 X |
| 4,006,053 | 2/1977 | Goodfellow | 425/519 X |
| 4,028,042 | 6/1977 | Goodfellow et al. | 425/515 |

Primary Examiner—J. Howard Flint, Jr.
Attorney, Agent, or Firm—Sughrue, Rothwell, Mion, Zinn and Macpeak

[57] ABSTRACT

The invention relates to a mould, more particularly an injection mould, for the production of half-finished mouldings or parisons, more particularly Apex rings, from work materials on a rubber basis in a mould cavity bounded by at least two mould parts, more particularly by an upper mould or a lower mould and an intermediate plate.

12 Claims, 4 Drawing Figures

DIE CASTING SYSTEM FOR THE PRODUCTION OF RUBBER MOULDINGS

BACKGROUND OF THE INVENTION

For the production of certain mouldings from work materials on a rubber basis use is made of separately produced unvulcanised half-finished parts or parisons. In this connection here we are speaking more particularly of so-called Apex rings, which are further employed in the finishing of vehicle tires for the formation of a steel bead at the edge side. These pre-finished parisons or half-finished mouldings are produced in corresponding moulds without vulcanisation as "accelerated rubber mixtures". During the further working parisons are vulcanised with the work material for the other part of the final moulding introduced into a corresponding mould and thereby integrated with the final moulding.

Particular requirements are placed upon the external shape as well as the technological qualities of the above-mentioned moulded parisons of rubber mixtures. The parisons must be worked very exactly and must possess particular qualities in respect of the material characteristics such as plasticity and stability of the external surface of the parison.

SUMMARY OF THE INVENTION

The invention is based on the problem of proposing a mould, and indeed more particularly an injection mould, for the production of such parisons of rubber mixtures, which renders possible the completion of qualitatively faultless parisons with higher efficiency.

For the solution of this problem according to the invention the mould or injection mould is characterised in that one of the mould parts for the defining of the mould cavity, especially the upper mould or the lower mould bounding a larger external surface zone of the moulding, is maintained at a proportionately lower temperature, and the other mould part, especially the intermediate plate, is maintained at a relatively high temperature.

The invention is based upon the recognition that high qualitative requirements can be further improved with rapid short working cycles maintained thereby, in that the work material is brought to a proportionately lower temperature within a short time after the filling of the same into the mould cavity. For this purpose the upper mould or lower mould is expediently cooled, for example to a temperature of about 30° C., whereas the intermediate plate acting as counter mould part is heated, for example to a temperature of about 100° C.

By means of the mould parts having different temperatures there is further achieved a particularly surprising effect during opening of the mould by the moving apart of the mould parts the moulding always remains retained to the mould part with the lower temperature. In the case of a mould with an upper mould, lower mould and intermediate plate this means that the mouldings, more particularly Apex rings, during the moving apart always remain retained exclusively to the upper and lower mould. Thus these mould parts can be provided with particular ejectors, which during the opening procedure take care of the lifting of the moulding so that when the mould is opened it can be taken out directly.

In the case of an injection mould according to a further proposal of the invention, the casting passages leading to the mould cavity are formed exclusively within the heated mould part, which is arranged inside the intermediate plate. Thereby there arises the advantage that the work material on the way to the mould cavity is always maintained at a requisite higher temperature. With the entry into the mould cavity, or with the filling of the same there ensues a cooling at the same time. By heating the mould part accommodating the casting passages it is at the same time ensured that the work material remaining in the casting passages after the completion of a moulding is maintained fluent and therefore can enter immediately into the mould cavity during the next injection cycle. The removal of moulding dead-heads etc. is therefore unnecessary.

DESCRIPTION OF THE DRAWINGS

An example of embodiment of the invention is described in more detail hereinafter with reference to the drawings.

The example of embodiment illustrated in the drawings relates to an injection mould for the production of Apex rings, such as are employed in the completion of vehicle tires. Here the injection mould is constructed as a double mould. Two annular mould cavities 10 and 11 are supplied simultaneously with work material during one injection cycle. In FIG. 1 these mould cavities 10, 11 are shown in each instance in cross-section or radial section, wherefrom at the same time there appears the cross-sectional form of an Apex ring. This consists of a bead 12 rectangular in cross-section, in which is accommodated a metal reinforcement, for example, of coiled wire previously located in the mould cavity 10 or 11, and of an annular flap 13 (see especially FIG. 3) joining thereonto and in cross-section running off at an angle to a radial edge.

Figure 1:
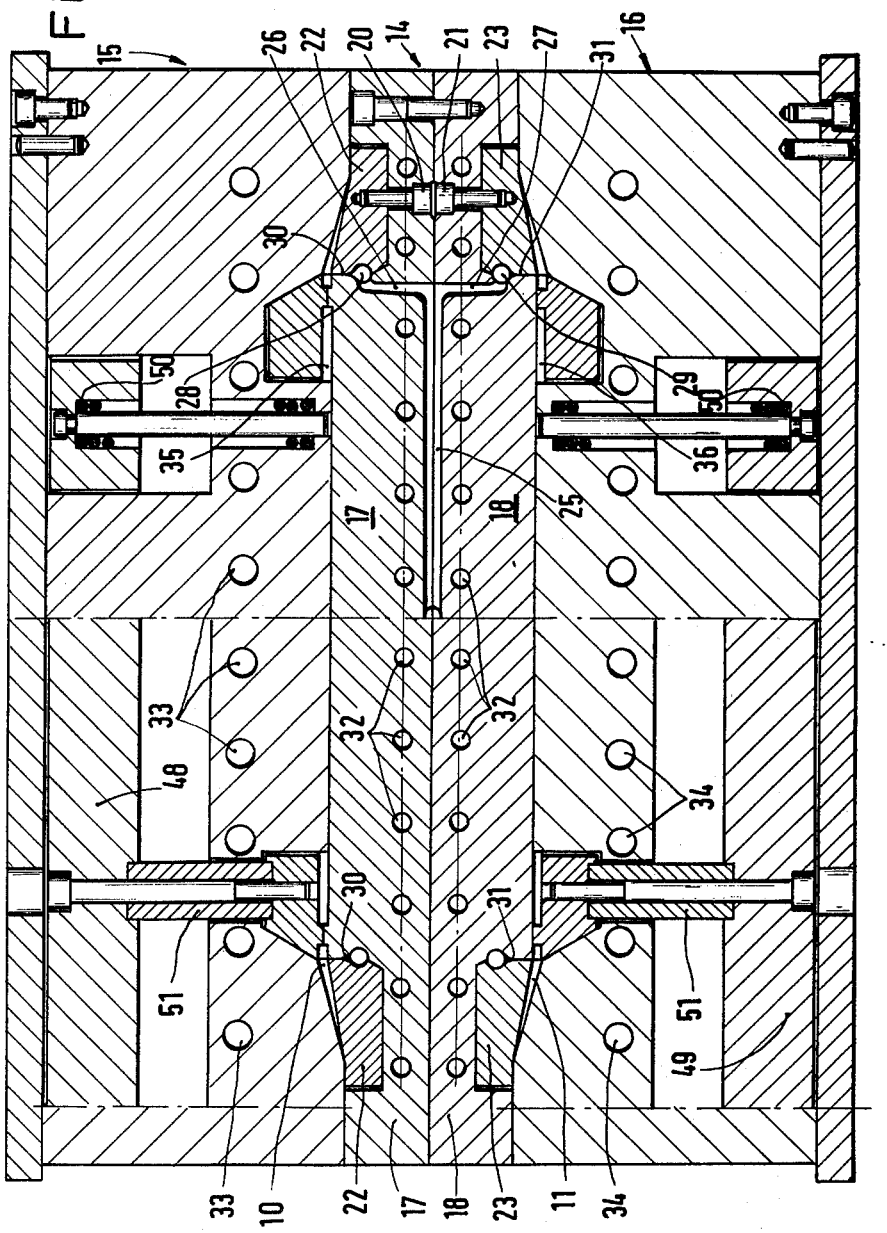
FIG. 1 is an off-set radial section through a closed injection mould for the production of Apex rings.

The mould cavity 10 or 11 thus formed is bounded on the one side by a common intermediate plate 14 and on the other side by an upper mould 15 or a lower mould 16.

The intermediate plate 14 is constructed of several parts. It consists of two similar plate parts 17 and 18, secured to one another as by screws 19. In corresponding annular recesses of the plate parts 17, 18, in the vicinity of the mould cavities 10 and 11, there are provided annular insert pieces 22 and 23 which bound a partial zone, namely the annular flaps 13 of the Apex rings. The annular pieces 22 and 23 are secured to plate parts 17, 18 by screws 20 and 21. The bead 12 is bounded directly by the plate parts 17 and 18.

A system of casting passages is arranged exclusively within the intermediate plate 14. Connecting passages 25 lead radially from a central passage 24 outwardly to the region of the mould cavities 10 and 11. Here the connecting passages 25 are provided with upwardly and downwardly directed branches 26 and 27, which open in each instance into an annular passage 28 or 29. The annular passages 28, 29 are bounded on the one side by the plate parts 17, 18 and on the other side by the insert pieces 22, 23 in such a manner that the annular passages 28, 29 have a substantially circular cross-section. The passages are tapered toward the respective mould cavities 10 and 11, so that the annular passage 28 or 29 open into the mould cavities 10 and 11 through annular gaps 30 and 31. Consequently the work material is distributed in peripheral direction and then introduced in concentrated manner into the mould cavities 10, 11.

By means of heating passages 32—say the intermediate plate 14 is maintained at a predetermined temperature of about 100° C., thus temperature-conditioned. The heating passages 32 are arranged above and below, the connecting passages 25, so that the work material in these connecting passages is maintained at the desired temperature. Furthermore, outwardly-lying heating passages 32 are provided at the radially outwardly-lying side of the branches 26 and 27. Therefore, the casting passages are surrounded by heating passages 32.

Figure 4:
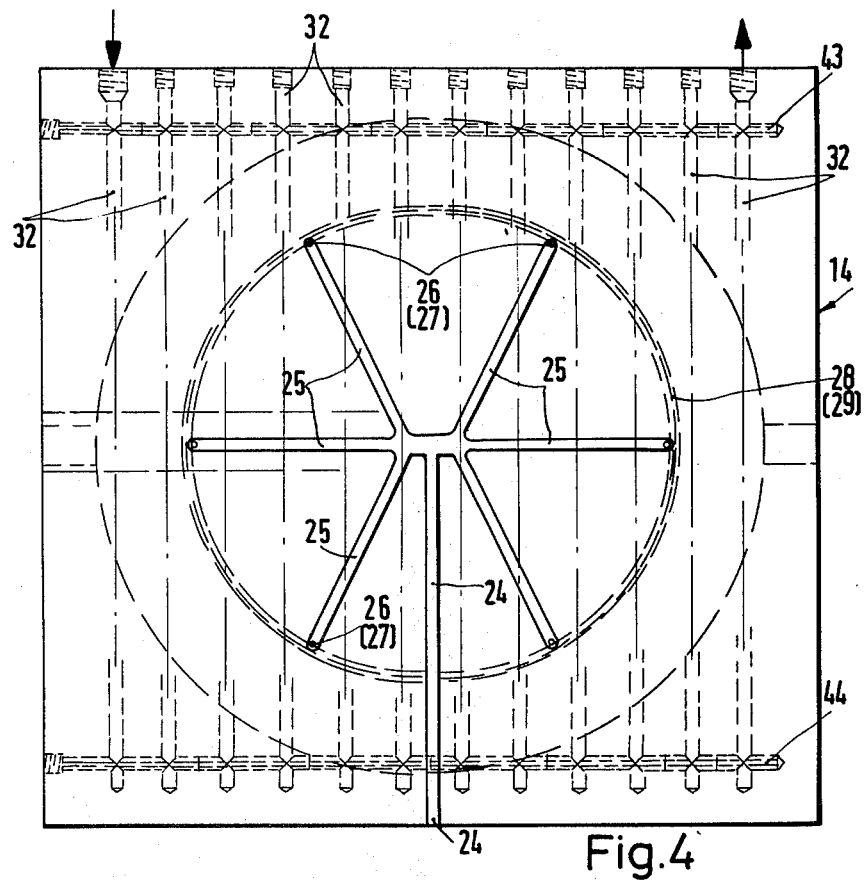

On the contrary the upper mould 15 and lower mould 16 are cooled, and for this purpose are provided with cooling passages 33 and 34. These maintain the upper mould 15 and lower mould 16 at a relatively lower temperature on the order of 30° C. In the present instance the cooling passages 33 and 34, and likewise heating passages 32, are formed as a system of rectilinear bores, which are introduced from one side into the substantially rectangular work pieces and which in the vicinity of their ends are connected to one another through transverse bores 43, 44 (FIG. 4). The entry and exit of the heating or cooling medium is indicated by arrows in FIG. 4.

In order to obviate any notable thermal transmission from the intermediate plate 14 to the upper mould 15 or to the lower mould 16 there may be provided insulating air spaces between the above-mentioned mould parts. In the present example such gaps 35 and 36 are arranged between the intermediate plate 14 and an injector ring 37 or 38 constructed as an insert piece.

A special effect resides in that the mouldings, namely Apex rings, upon opening of the mould, remain retained on the mould parts of lower temperature, that is, on the upper mould 15 and lower mould 16. Expediently, the opening operation proceeds so that the intermediate plate 14 and the upper mould 15 are raised by different amounts from the lower mould 16. Then the two simultaneously produced Apex rings can be removed from the upper mould 15 and the lower mould 16.

Figure 2:
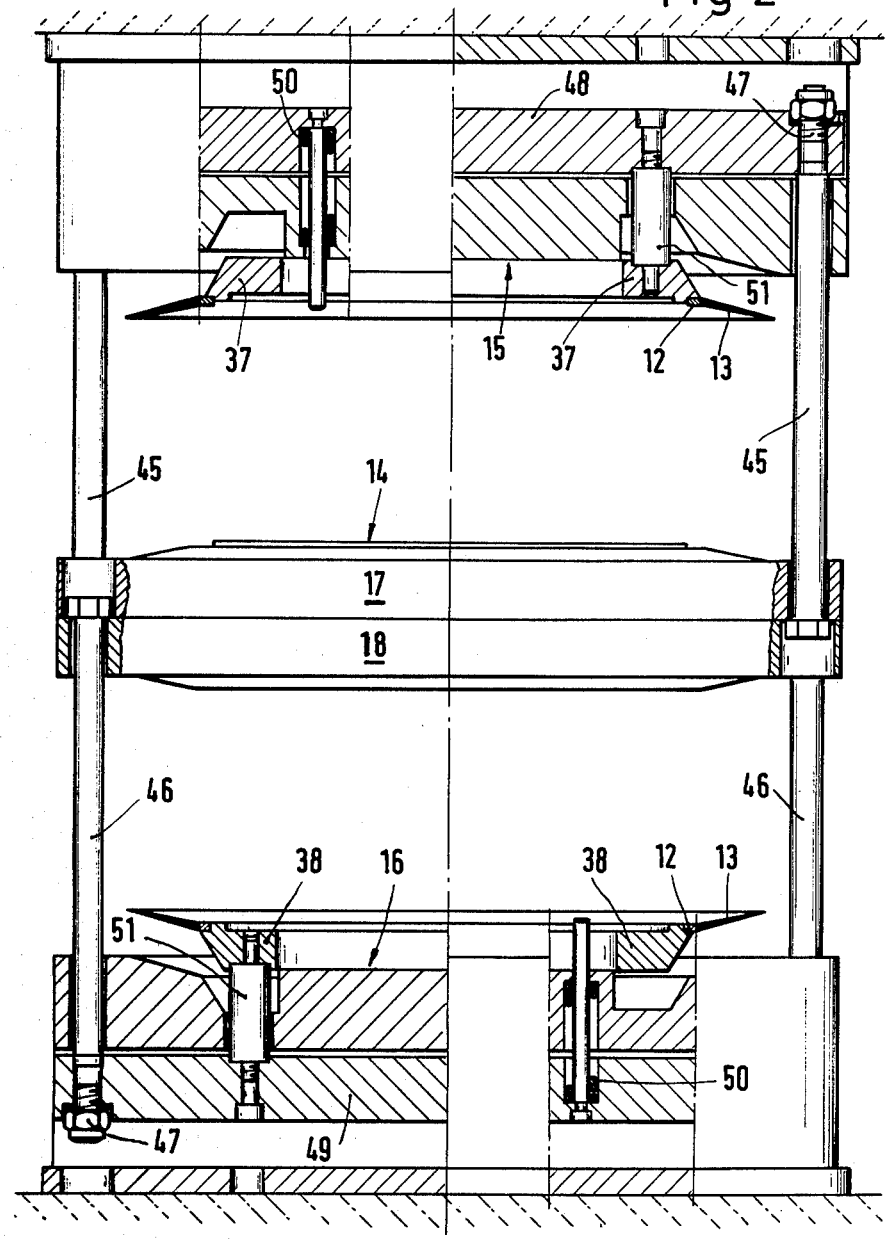
FIG. 2 is a view similar to FIG. 1 in simplified representation, likewise in off-set radial section, and partially in elevation, of the mould in the open condition.
Figure 3:
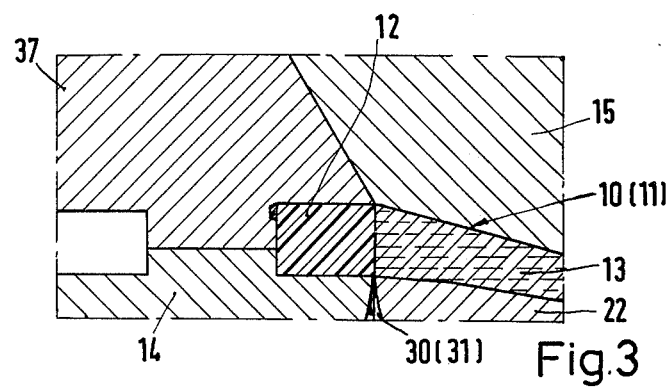
FIG. 3 is an enlarged detail of the closed injection mould in radial section, and, FIG. 4 is a plan view one-half of an intermediate plate of the injection mould according to FIG. 1.

In order to facilitate or accelerate the above-mentioned removal and to effect it in a beneficial manner for the moulding, the upper mould 15 and lower mould 16 are provided with an ejector device. This consists in each instance of an ejector ring 37 or 38. The ejector rings 37, 38 as best seen in FIG. 2 rest movably in corresponding recesses of the upper mould 15 and lower mould 16. An externally-lying edge region of these ejector rings 37, 38 engage the Apex rings circumferentially, in the region of the bead 12. By raising of the ejector rings 37 or 38 from the upper mould 15 or lower mould 16 thereafter the Apex rings are raised out of the respective mould nests. As the mouldings are engaged equally circumferentially in the region of the more highly loadable bead 12, the ejection procedure can proceed relatively quickly without thereby impairing the Apex rings.

The program of movement during opening of the mould as well as during ejection of the moulding by means of the ejection rings 37 and 38 is visible in FIG. 2. Accordingly the upper mould 15 and lower mould 16 are connected by means of slide bolts 45 and 46 respectively to the intermediate plate 14. When the upper mould 15 is lifted, this motion is effected with spacing of the intermediate plate 14 from the upper mould 15.

In the end position the upper mould part 15, lower mould 16 and intermediate plate 14 are separated from one another by the lengths of the slide bolts 45, 46.

The slide bolts 45, 46 are anchored with their ends 47 in a pressure plate 43, 49. The pulling apart of the mould parts as far as abutments formed by the ends 47 of the slide bolts 45, 46 has the effect that the above-mentioned pressure plates 48 and 49 are lowered or raised out of an upper end position or a lower end position as far as abutment against the upper mould 15 or lower mould 16. This movement of the pressure plates 48, 49 is effected against the force of return springs 50. The relative movement of the pressure plates 48 and 49 as regards the upper mould 15 and lower mould 16 causes the outward travel of push plungers 51 and 52, which are arranged respectively on the ejector rings 37 and 38. Thereby the latter are raised out of the annular recesses of the upper mould 15 and lower mould 16, with entraining of the mouldings 12/13. The opening movement of the mould whereby the intermediate plate 14, upper mould 15 and lower mould 16 are separated causes the automatic raising of the ejector rings 37 and 38 and therewith the final mouldings.

We claim:

1. A pressure die casting system for producing rubber mouldings and including at least one heated mould section and at least one cooled mould section, said mould sections forming a mould cavity therebetween, the improvement comprising:

(a) heating means associated with at least one mould section, (b) cooling means associated with at least one mould section for exclusively retaining said rubber moulding adhesively attached to said cooled mould section upon separation of said cooled mould section and said heated mould section, said adhesive attachment to said cooled mould section being achieved solely by means of the cooled mould section being maintained at a lower temperature than said heated mould section, and (c) ejector means associated with said cooled mould section for removing said rubber moulding therefrom after said separation of said cooled mould section and said heated mould section.

2. A die casting system according to claim 1, wherein said heated mould section comprises a center plate, and said cooled mould sections comprise upper and lower mould halves, whereby said die casting system produces two rubber mouldings simultaneously.

3. A die casting system according to claim 1 or 2, wherein casting passages are arranged in the heated mould section.

4. A die casting system according to claims 1 or 2, wherein a heat-insulating gap is formed between the center plate and the upper and lower mould halves.

5. A die casting system according to claim 3 wherein said casting passages comprise passages in the center plate comprising a central passage leading to the middle of the plate, radial connection passages connecting thereto, and branches directed to the said mould cavities.

6. A die casting system according to claim 5, wherein the said branches are transverse to the connection passages and open into a surrounding annular passage which is connected with the said mould cavity.

7. A die casting system according to claim 6 wherein the opening of the annular passage into the said mould cavity is formed as a tapering annular gap.

8. A die casting system according to claim 7, wherein said annular gap opens into said mould cavity, and is spaced from the ends thereof.

9. A die casting system according to claim 3 wherein heating passages are arranged at both sides of, and are adjacent to, said branches.

10. A die casting system according to claim 2, wherein said upper mould and said lower mould are provided with an annularly encircling ejection ring in the vicinity of the mould cavity, which is displaceable relative to the said upper mould and the said lower mould.

11. A die casting system according to claim 10, wherein said ejection ring annularly engages a partial zone of the moulding by means of a bead.

12. A die casting system according to claim 9, wherein cooling passages are provided in the upper and lower moulding halves, and said heating passages and said cooling passages comprise a plurality of planar parallel bores, said bores terminating at their ends in a transverse bore.

* * * * *